United States Patent
Sugimoto

(10) Patent No.: US 11,453,303 B2
(45) Date of Patent: Sep. 27, 2022

(54) POWER SUPPLY CIRCUIT OF ELECTRIFIED VEHICLE

(71) Applicant: TOYOTA JIDOSHA KABUSHIKI KAISHA, Toyota (JP)

(72) Inventor: Kazuhiro Sugimoto, Ashigarakami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/987,773

(22) Filed: Aug. 7, 2020

(65) Prior Publication Data

US 2021/0101498 A1    Apr. 8, 2021

(30) Foreign Application Priority Data

Oct. 7, 2019  (JP) .............................. JP2019-184584

(51) Int. Cl.
| | |
|---|---|
| *B60L 53/10* | (2019.01) |
| *B60L 53/53* | (2019.01) |
| *H02J 7/04* | (2006.01) |
| *H02M 3/158* | (2006.01) |

(52) U.S. Cl.
CPC .............. *B60L 53/53* (2019.02); *B60L 53/11* (2019.02); *H02J 7/04* (2013.01); *H02M 3/1582* (2013.01); *B60L 2210/10* (2013.01)

(58) Field of Classification Search
USPC ................................................ 307/10.1, 9.1
See application file for complete search history.

(56) References Cited

U.S. PATENT DOCUMENTS

| | | | |
|---|---|---|---|
| 5,793,189 A | 8/1998 | Kawaguchi et al. | |
| 2020/0076293 A1* | 3/2020 | Mochizuki | ................ H02J 1/02 |
| 2020/0086755 A1* | 3/2020 | Maruyama | ............. B60L 50/51 |
| 2021/0006082 A1* | 1/2021 | Wei | ......................... B60L 53/14 |

FOREIGN PATENT DOCUMENTS

| | | |
|---|---|---|
| JP | H09-009402 A | 1/1997 |
| JP | H10-304580 A | 11/1998 |
| JP | 2010-045961 A | 2/2010 |
| JP | 2015-201915 A | 11/2015 |

* cited by examiner

*Primary Examiner* — Rexford N Barnie
*Assistant Examiner* — Xuan Ly
(74) *Attorney, Agent, or Firm* — Oliff PLC

(57) ABSTRACT

A power supply circuit of an electrified vehicle according to the present disclosure is mounted on the electrified vehicle including: a battery configured to receive an electric power from an external DC power supply; an accessory configured to operate at a system voltage of the battery; and a DC inlet to which a voltage higher than the system voltage is applied from the external DC power supply. The power supply circuit includes a first power line, a step-down converter and a second power line. The first power line is configured to connect the DC inlet and the battery. The step-down converter is disposed on the first power line and configured to lower a voltage supplied to the battery from the DC inlet. The second power line has one end connected to the first power line between the step-down converter and the battery, and another end connected to the accessory.

2 Claims, 3 Drawing Sheets

First Embodiment

Comparative Example

POWER SUPPLY CIRCUIT OF ELECTRIFIED VEHICLE

CROSS-REFERENCE TO RELATED APPLICATION

The present disclosure claims priority under 35 U.S.C. § 119 to Japanese Patent Application No. 2019-184584, filed on Oct. 7, 2019. The content of which is incorporated herein by reference in its entirety.

BACKGROUND

Technical Field

The present disclosure relates to a power supply circuit of an electrified vehicle, and more specifically to a power supply circuit compatible with quick charging using an external DC power supply.

Background Art

For example, JP 2015-201915 A discloses a vehicle equipped with an external connection portion (AC inlet) connected to an AC power supply outside the vehicle, and a battery. In this vehicle, a DC/DC converter is disposed on a power line that connects the AC inlet and the battery.

SUMMARY

In an electrified vehicle equipped with a battery configured to receive an electric power from an external DC power supply, there is the following problem with regard to the installation of an accessory configured to operate at the system voltage of the battery. More specifically, when quick charging the battery by increasing the voltage applied to a DC inlet from the external DC power supply above the system voltage, it is required to be able to protect the accessory from high voltage while reducing an increase in cost due to high voltage measures.

The present disclosure has been made in view of the problem described above, and an object of the present disclosure is to provide a power supply circuit of an electrified vehicle that can protect, from high voltage, an accessory configured to operate at the system voltage of a battery and also reduce an increase in cost due to high voltage measures when performing a quick charging at a high voltage.

A power supply circuit of an electrified vehicle according to the present disclosure is mounted on the electrified vehicle including: a battery configured to receive an electric power from an external DC power supply; an accessory configured to operate at a system voltage of the battery; and a DC inlet to which a voltage higher than the system voltage is applied from the external DC power supply. The power supply circuit includes a first power line, a step-down converter and a second power line. The first power line is configured to connect the DC inlet and the battery. The step-down converter is disposed on the first power line and configured to lower a voltage supplied to the battery from the DC inlet. The second power line has one end connected to the first power line between the step-down converter and the battery, and another end connected to the accessory.

The electrified vehicle may further include an electric motor configured to drive the electrified vehicle and a power control unit configured to drive the electric motor. The stepdown converter may also be configured as a step-up/down converter additionally including a function of boosting a voltage supplied from the battery. The power supply circuit may further comprise a third power line configured to connect the battery and the power control unit. The third power line may be further branched from the first power line between the DC inlet and the step-up/down converter.

The power supply circuit may include a DC relay disposed on the first power line between the DC inlet and the step-up/down converter and configured to switch between supply and stop of electric power. The third power line may also be branched from the first power line between the DC relay and the step-up/down converter.

According to the power supply circuit of an electrified vehicle of the present disclosure, the second power line for connecting the accessory to the battery is branched from the first power line between the step-down converter and the battery. Therefore, even if a voltage higher than the system voltage of the battery is applied to the DC outlet, it is possible to avoid applying a high voltage to the accessory. Consequently, when performing a quick charging at a high voltage, it becomes possible to protect, from the high voltage, the accessory configured to operate at the system voltage and also reduce an increase in cost due to high voltage measures.

DETAILED DESCRIPTION

Figure 1:
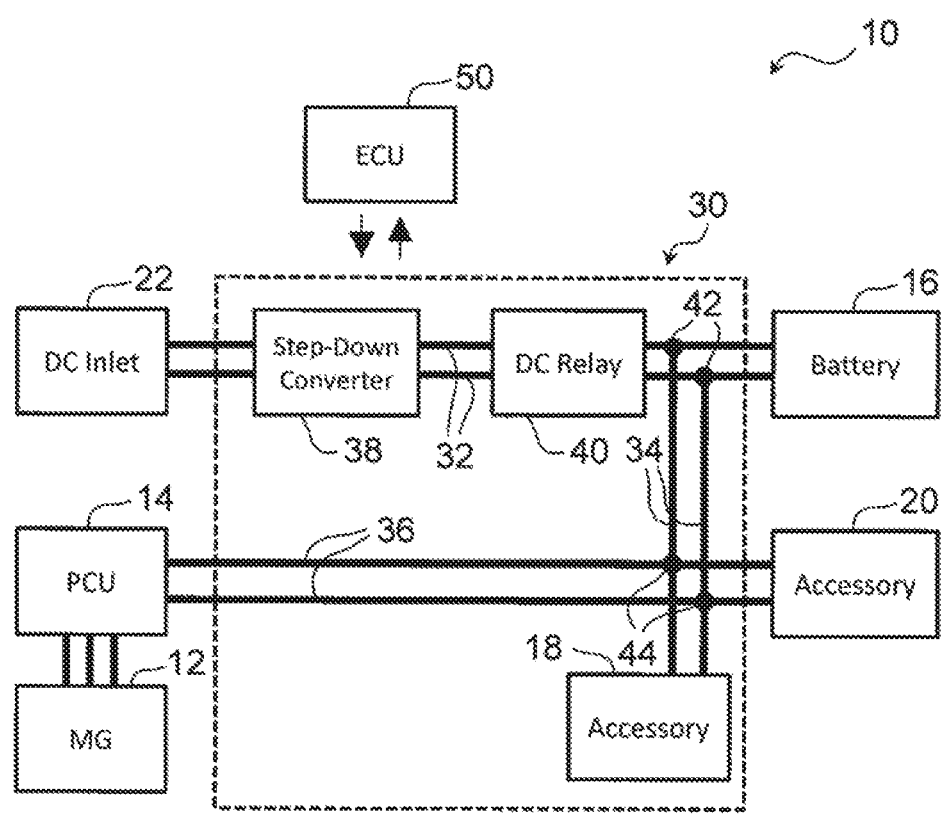
FIG. 1 is a block diagram schematically showing a configuration of a power supply circuit included in an electrified vehicle according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures, steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with respect to FIGS. 1 and 2.

1-1. Configuration of Power Supply Circuit

FIG. 1 is a block diagram schematically showing a configuration of a power supply circuit 30 included in an electrified vehicle 10 according to a first embodiment. The electrified vehicle (hereinafter, simply referred to as a "vehicle") 10 includes a motor generator (MG) 12 and a power control unit (PCU) 14. The MG 12 is an AC (alternating current) type as an example, and is configured to drive the vehicle 10. The PCU 14 is configured to drive the MG 12. The MG 12 corresponds to an example of the "electric motor" according to the present disclosure.

The vehicle 10 further includes a battery 16, accessories 18 and 20, and a DC (direct current) inlet 22. The battery 16 receives an electric power from an external DC power supply (charging facility) outside the vehicle 10. In more detail, the battery 16 is typically configured as a battery system that includes a plurality of battery modules (i.e., modules configured by a plurality of battery cells connected with each other) and an electronic control unit (battery ECU). The battery ECU measures, for example, the voltage, electric current and temperature of each battery module and monitors the temperature and the state of charge (SOC) of the battery system. The system voltage Vb (nominal value) of the battery 16 is 400V as an example.

The accessories 18 and 20 are configured to operate at the system voltage Vb. An example of the accessory 18 is an alternating current charger (AC charger) and a DC/DC converter. This AC charger (AC charging circuit) converts, to DC power, the AC power supplied from an external AC power supply via an AC inlet (not shown). The DC/DC inverter converts, to a desired direct current voltage, the direct current voltage outputted from the AC charger. Moreover, an example of the accessory 20 is a compressor for air conditioning in the passenger compartment of the vehicle 10 and a heater for heating water. The water mentioned here is used for heating the passenger compartment. It should be noted that the "accessory" according to the present disclosure is not limited to the example described above as long as it is configured to operate at the system voltage Vb, and any one or more accessories can be used.

The DC inlet 22 is configured to be connectable to the above described external DC power supply via cables and connectors that are not shown. A voltage higher than the system voltage Vb of the battery 16 (hereinafter, referred to as a "supply voltage Vs") is applied to the DC inlet 22 from the external DC power supply. An example of the supply voltage Vs is 800V.

Additionally, the system voltage Vb and the supply voltage Vs are not limited to the above described examples of 400V and 800V as long as the supply voltage Vs is higher than the system voltage Vb. Furthermore, the system voltage Vb is determined, for example, depending on the vehicle class, and a value other than 400V within the range of, for example, 350 to 400V is used as the system voltage Vb. Another example of the supply voltage Vs is 900V.

The power supply circuit 30 is mounted on the vehicle 10. The power supply circuit 30 includes a first power line 32, a second power line 34 and a third power line 36, which are respectively a pair of positive and negative power lines, and also includes a step-down converter 38 and a DC (direct current) relay 40.

The first power line 32 is configured to connect the DC inlet 22 and the battery 16. The step-down converter 38 is disposed on the first power line 32. The step-down converter 38 is a step-down DC/DC converter configured to lower the voltage (supply voltage Vs) supplied from the DC inlet 22 to the battery 16. In more detail, in the example in which the system voltage Vb is 400V and the supply voltage Vs is 800V, the step-down converter 38 steps down the voltage from 800V to 400V. In the vehicle 10 equipped with the battery 16 having the system voltage Vb of 400V, the use of this kind of step-down converter 38 allows charging of the battery 16 while supplying a high current to the battery 16 using a 350 kW class quick charging under a high supply voltage Vs, such as 800V.

The second power line 34 is configured to connect the battery 16 and the accessories 18 and 20. In the present embodiment, as shown in FIG. 1, this second power line 34 is branched from the first power line 32 at a branch point 42 between the step-down converter 38 and the battery 16. That is to say, one end of the second power line 34 is connected to the first power line 32 at the branch point 42, and the other end thereof is connected to the accessories 18 and 20. More particularly, in the example shown in FIG. 1, the second power line 34 is branched in a bifurcated manner at a branch point 44, and is connected to each of the accessories 18 and 20.

The DC relay 40 is disposed on the first power line 32 on the side closer to the DC inlet 22 than the branch point 42 to switch between supply and stop of electric power between the DC inlet 22 and the battery 16. In the example shown in FIG. 1, the DC relay 40 is disposed between the step-down converter 38 and the branch point 42. In more detail, the vehicle 10 includes an electronic control unit (ECU) 50 for controlling the vehicle 10, and the DC relay 40 is controlled by a command from the ECU 50 to switch between supply and stop of electric power.

The third power line 36 is configured to connect the battery 16 and the PCU 14 in order to power the MG 12 from the battery 16. In the example shown in FIG. 1, the third power line 36 is connected to the second power line 34 at the branch point 44. That is to say, in this example, the third power line 36 shares the section from the branch point 42 to the branch point 44 with the second power line 34.

The PCU 14 converts the DC power of the battery 16 into AC power and supplies it to the MG 12. The PCU 14 controls the MG 12 based on a command from the ECU 50.

In addition, in the example shown in FIG. 1, the power supply circuit 30 is configured as a high voltage unit integrally including the DC relay 40 and the step-down converter 38. In FIG. 1, this high voltage unit is a portion surrounded by a broken line frame. Moreover, this high voltage unit also integrally includes a function of branching, from the first power line 32, the second power line 34 arranged to connect the accessories 18 and 20 to the battery 16. Furthermore, in the example shown in FIG. 1, inside the high voltage unit, the accessory 18 is also incorporated. However, similarly to the accessory 20, the accessory 18 may be disposed outside the high voltage unit.

1-2. Effect

Figure 2:
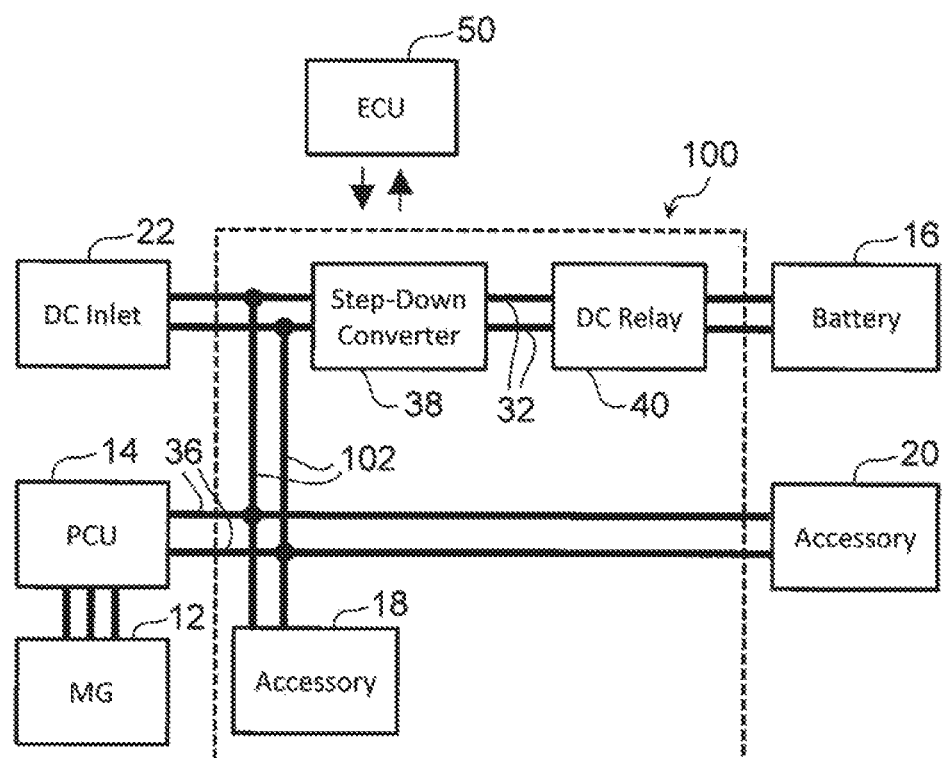
FIG. 2 is a block diagram schematically showing a configuration of a power supply circuit according to a comparative example.

FIG. 2 is a block diagram schematically showing a configuration of a power supply circuit 100 according to a comparative example. The effect of the power supply circuit 30 according to the first embodiment will be described in comparison with the power supply circuit 100 according to the comparative example.

First, in the comparative example shown in FIG. 2, the second power line 102 for connecting the accessories 18 and 20 with the battery 16 is branched from the first power line 32 between the DC inlet 22 and the step-down converter 38. As a result, when a high supply voltage Vs, such as 800V, is applied to the DC inlet 22, this supply voltage Vs which is higher than the system voltage Vb is applied to the accessories 18 and 20. Because of this, it is necessary to take measures to the accessories 18 and 20 so as to withstand high voltage, or measures to change the circuit configuration of the power supply circuit 100. This kind of high voltage measures will lead to an increase in cost.

In contrast to the above, according to the power supply circuit 30 in the first embodiment, the second power line 34 for connecting the accessories 18 and 20 with the battery 16 is branched from the first power line 32 between the step-down converter 38 and the battery 16. Because of this, even if the supply voltage Vs higher than the system voltage Vb is applied to the DC inlet 22, it is possible to avoid applying a high voltage to the accessories 18 and 20. Thus, when performing a quick charging at a high supply voltage Vs, the power supply circuit 30 makes it possible to protect, from high voltage, the accessories 18 and 20 that operate at the system voltage Vb while reducing an increase in cost due to high voltage measures.

2. Second Embodiment

Next, a second embodiment according to the present disclosure will be described with reference to FIG. 3.

2-1. Configuration of Power Supply Circuit

Figure 3:
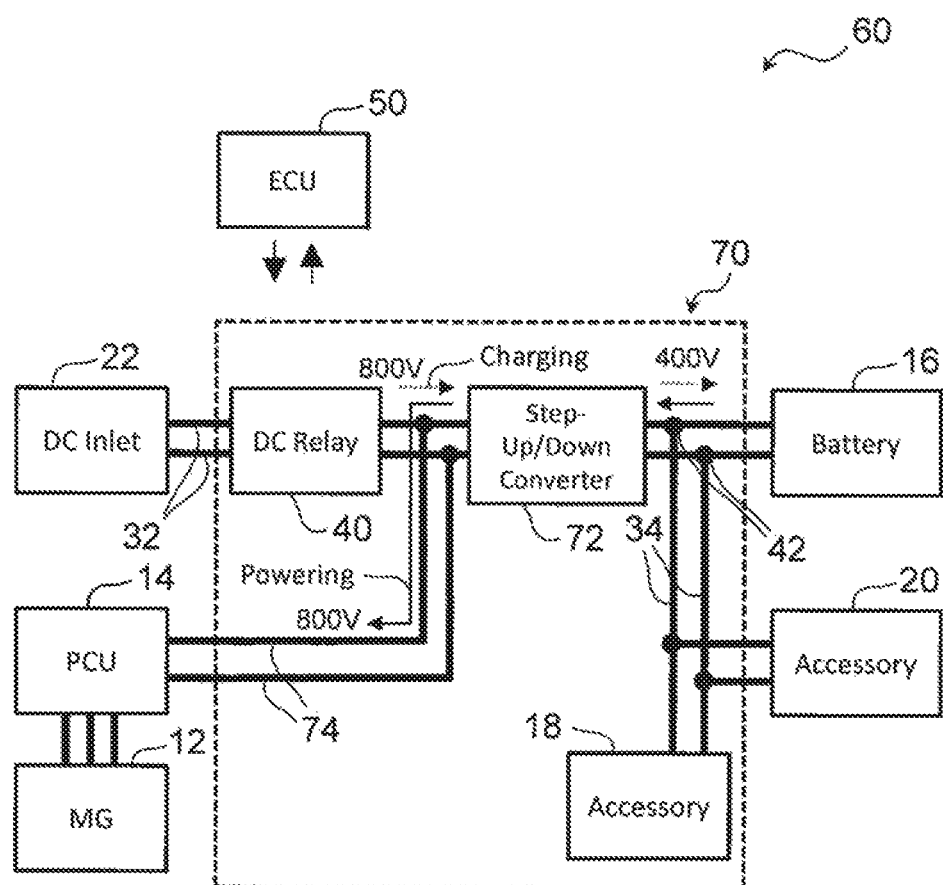
FIG. 3 is a block diagram schematically showing a configuration of a power supply circuit of an electrified vehicle according to a second embodiment of the present disclosure.

FIG. 3 is a block diagram schematically showing a configuration of a power supply circuit 70 of an electrified vehicle 60 according to the second embodiment. The power supply circuit 70 according to the present embodiment is configured similarly to the power supply circuit 30 according to the first embodiment except for the following points.

The power supply circuit 70 includes a step-up/down converter 72. The step-up/down converter 72 is configured to have a step-up function for increasing the voltage supplied from the battery 16 in addition to the step-down function for lowering the voltage supplied from the DC inlet 22 to the battery 16 similar to the step-down converter 38 (see FIG. 1). When the system voltage Vb (400V) of the battery 16 is equal to the input voltage thereof, the step-up/down converter 72 boosts the voltage from 400V to 800V. The accessories 18 and 20 are disposed on the first power line 32 between the step-up/down converter 72 and the battery 16, similar to the first embodiment.

Then, in the power supply circuit 70, unlike the power supply circuit 30, a third power line 74 configured to connect the battery 16 and the PCU 14 is branched from the first power line 32 between the DC inlet 22 and the step-up/down converter 72. In more detail, in the example shown in FIG. 3, unlike the power supply circuit 30, the DC relay 40 is disposed on the first power line 32 between the DC inlet 22 and the step-up/down converter 72. In other words, the step-up/down converter 72 is disposed on the first power line 32 between the DC relay 40 and the branch point 42. Also, the third power line 74 is branched from the first power line 32 between the DC relay 40 and the step-up/down converter 72.

2-2. Effect

According to the power circuit 70 of the second embodiment described so far, during quick charging using the high supply voltage Vs (800V) of the external DC power supply, the voltage supplied to the battery 16 is lowered from 800V to 400V by the step-up/down converter 72. Therefore, similarly to the power supply circuit 30 of the first embodiment, it is possible to avoid applying a high voltage the accessories 18 and 20 during quick charging.

Furthermore, according to the power supply circuit 70 of the second embodiment, the following effects 1-3 can be achieved during running (during power running) of the vehicle in which the MG 12 is driven using the electric power of the battery 16.

First, the third power line 74 connected to the PCU 14 is located between the DC inlet 22 and the step-up/down converter 72. More particularly, in the example shown in FIG. 3, the third power line 74 is connected between the DC relay 40 and the step-up/down converter 72. Thus, when the vehicle is running (when the vehicle is powered), the high voltage (800V) which has been boosted by the step-up/down converter 72 can be used for driving the MG 12 (i.e., the effect 1 is achieved), unlike the power supply circuit 30 (see FIG. 1). In addition, in the example of the power supply circuit 30 according to the first embodiment, in order to make a high voltage, such as 800V, available for driving the MG 12, it is required to separately dispose a step-up converter on the third power line 36. In contrast, according to the circuit configuration of the power supply circuit 70, it becomes possible to use the high voltage for driving the MG 12 while avoiding complication of the circuit configuration due to adding this kind of step-up converter separately and reducing an increase in cost.

Then, according to the circuit configuration of the comparative example shown in FIG. 2, if the step-up/down converter 72 is arranged on the position of the step-down converter 38 in place of the step-down converter 38, the high voltage can be applied to the PCU 14. However, the high voltage is also applied to the accessories 18 and 20 unnecessarily. In contrast, according to the power supply circuit 70, the accessories 18 and 20 are disposed on the side closer to the battery 16 than the step-up/down converter 72, and the third power line 74 is disposed on the side closer to the DC inlet 22 than the step-up/down converter 72. Therefore, when the vehicle is running (when the vehicle is powered), it becomes possible to use the boosted high voltage (800V) for driving the MG 12 while preventing the high voltage from being applied to the accessories 18 and 20 (i.e., the effect 2 is achieved).

Then, according to the power supply circuit 70, the DC relay 40 is arranged between the step-up/down converter 72 and the DC inlet 22 (relay arrangement example 1). Unlike this relay arrangement example 1, the DC relay 40 may be disposed on the side closer to the battery 16 than the connection position of the third power line 74 to the first power line 32 (relay arrangement example 2). Even in this relay arrangement example 2, it is possible to achieve the effects 1 and 2 described above. However, in the relay arrangement example 2, when supplying an electric power from the battery 16 to the PCU 14, power consumption is generated due to conduction (closing) of the DC relay 40. In contrast, according to the power supply circuit 70 that adopts the relay arrangement example 1, during running of the vehicle (during power running), the DC relay 40 can be kept in a non-conductive (open) state. Therefore, it becomes possible to use a high power after boosting while reducing the power consumption of the DC relay 40 (i.e., the effect 3 is achieved).

What is claimed is:

1. A power supply circuit for mounting on an electrified vehicle including: a battery configured to receive an electric power from an external DC power supply; an accessory configured to operate at a system voltage of the battery; a DC inlet to which a voltage higher than the system voltage is applied from the external DC power supply; an electric motor configured to drive the electrified vehicle; and a power control unit configured to drive the electric motor, the power supply circuit comprising:
  a first power line configured to connect the DC inlet and the battery;
  a step-up/down converter disposed on the first power line and configured to:
    lower a voltage supplied to the battery from the DC inlet; and boost a voltage supplied from the battery;
a second power line having one end connected to the first power line between the step-up/down converter and the battery, and another end connected to the accessory; and
a third power line configured to connect the battery and the power control unit, the third power line being branched from the first power line between the DC inlet and the step-up/down converter.

2. The power supply circuit according to claim 1, further comprising:
a DC relay disposed on the first power line between the DC inlet and the step-up/down converter and configured to switch between supply and stop of electric power,
wherein the third power line is branched from the first power line between the DC relay and the step-up/down converter.

\* \* \* \* \*